Figure 1:
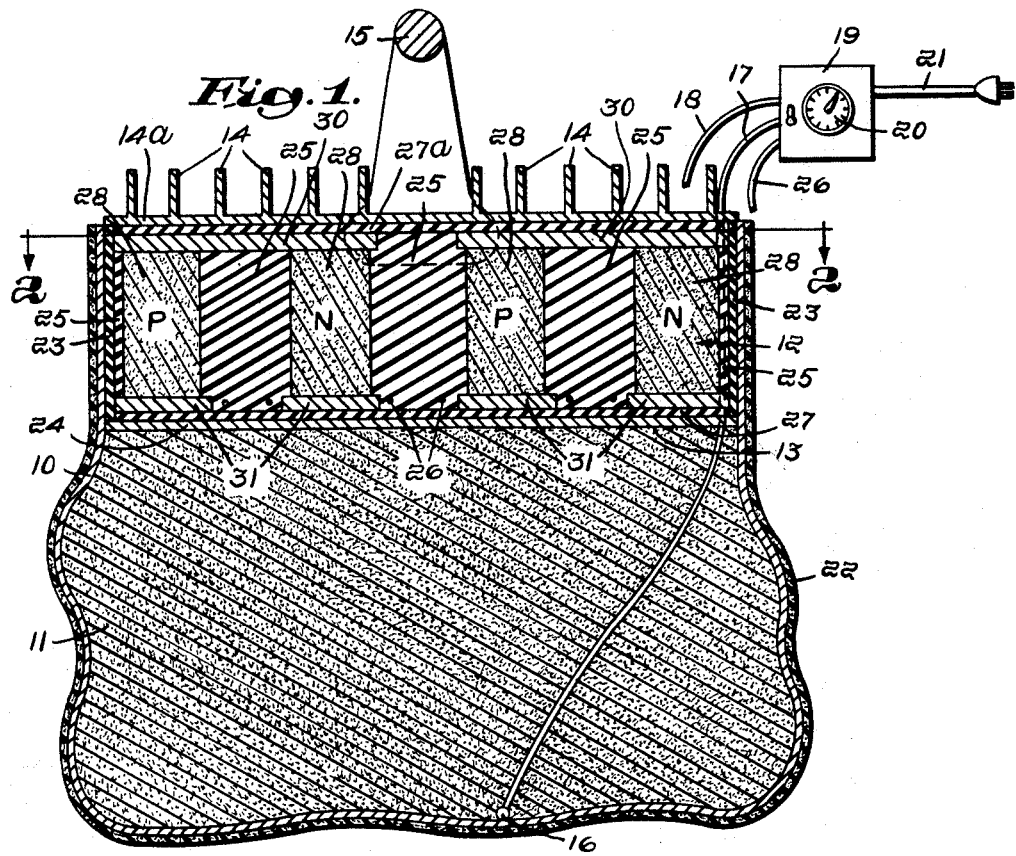

May 12, 1964  W. B. NOWAK  3,132,688
ELECTRONIC COLD AND/OR HOT COMPRESS DEVICE
Filed April 8, 1963

Inventor:
Welville B. Nowak,
by Aaron Tushin
Attorney

United States Patent Office 3,132,688
Patented May 12, 1964

3,132,688
ELECTRONIC COLD AND/OR HOT
COMPRESS DEVICE
Welville B. Nowak, 17 Furbush Ave.,
West Newton, Mass.
Filed Apr. 8, 1963, Ser. No. 271,261
9 Claims. (Cl. 165—25)

This invention relates to a thermal device for cooling and/or heating a local region of a body having an irregular surface, for the purpose of controlling the temperature of the region or of the body. More specifically, a combination cold and hot compress device is based upon the principle of adding or subtracting heat from a contacting irregular shaped body in the utilization of a thermoelectric module in place of the conventional ice or hot water bags as hereinafter more fully disclosed.

In an animal body, the soothing and therapeutic effects of the application or removal of heat to various regions of the body are well known per se. For example, ice packs and cold water compresses are often used for the relief of headaches and the treatment of sprains and other muscular strains, especially if they involve the rupture of blood vessels. During the treatment of sprains hot compresses are also used. Cold compresses are often of value in treating certain eruptions of the skin. In addition, it is often desired to cool or heat an inanimate body, or region thereof, for scientific or other reasons. When such a body, or region, has an irregular surface my invention will be of especial value in the extraction or application of heat.

As presently practiced, the use of ice packs and cold compresses are cumbersome and inconvenient and have other disadvantages as, for example, in most instances the temperature of the body surface and the rate of heat addition or removal therefrom are relatively uncontrolled. Invariably two separate and distinct devices are necessary to effect the result of the single double effect of the present device. The double effect of heating and/or cooling may, by the present device, be used for both heating or cooling and in a cyclical manner if desired. Ice packs require a filling of ice and must be refilled after a moderate time because the ice will melt and the temperature of the pack will thenceforth increase. Obviously, the temperature of the ice pack is fixed at approximately zero degrees centigrade (melting point of ice) and may be changed only by using in the pack other substances having the desired temperature as a melting point. Such substances may not be readily available. The temperature of a cold compress is most often adjusted initially by soaking the compress in a solution kept at a low temperature. Upon application of the compress to the body, the compress rapidly absorbs heat with the consequence that compresses must be frequently changed. The inconvenience, effort, and time expended in soaking, in wringing out excess solution, and in re-applying the compress frequently is considerable. Inevitably, the temperature of the original solution increases and the solution must be replaced, cooled, or other means provided to maintain the desired cooling temperature. The same is true when application of hot compresses or poultices is desirable. Spot-cooling or heating applications, as cited above, are ideal for utilization of thermoelectric Peltier junction or semi-conductor refrigeration devices. Whereas previous inventions (U.S. Patent Nos. 2,938,356 and 2,991,627) for the purpose of cooling and heating bodies by means of Peltier junctions have located thermoelectric Peltier junctions pairwise near opposite sides of a flexible supporting member of low thermal conductivity, my device locates all junctions at the section of the flexible member away from the body to be treated and requires an adjacent section containing a flexible member of high thermal conductivity in contact with the body to be treated. In addition to the relatively high cost of fabricating the articles described in the above patents, the potential life of the prior art devices may be very limited due to the brittle nature and fragility of the most efficient materials now known for use in Peltier junctions, i.e., semiconductor materials such as bismuth telluride, etc. The present invention circumvents these difficulties by keeping the fragile members of the Peltier junctions protected within a module that is economical to fabricate; the heat is then transmited from the body to be cooled or vice versa to the heat-pump module by a high thermal conductivity flexible member in contact therewith.

It is the principal object of my invention to cool or heat, separately or cyclically, in an easily controllable fashion a body, or region thereof, having flat, curved, irregular, or undulating surfaces, by utilizing a thermoelectric module instead of devices such as ice packs, cold compresses, heating pads or poultices. It is another object of my invention to provide cooling temperatures and cooling rates more easily controlled and over a much larger range than afforded by present means such as ice packs and cold compresses. It is a further object of my invention to automatically and cyclically control the cooling or heating of a body in a most efficient and convenient manner wherein a greater range of temperatures, greater heat flow potentialities and longer rate of heat removal or supply is effected. Other advantageous objects will be apparent from the following more detailed description.

Briefly, this invention consists of a flexible section of high thermal conductivity affixed to a thermoelectric heat-pump module section containing one or more sets of Peltier junctions. This device carries a set of heat dissipating fins extending away from said thermoelectric heat-pump section for use in cooling operation, and in addition an auxiliary heating coil extending around said module for use when the module is operating as a heating device.

Figure 2:
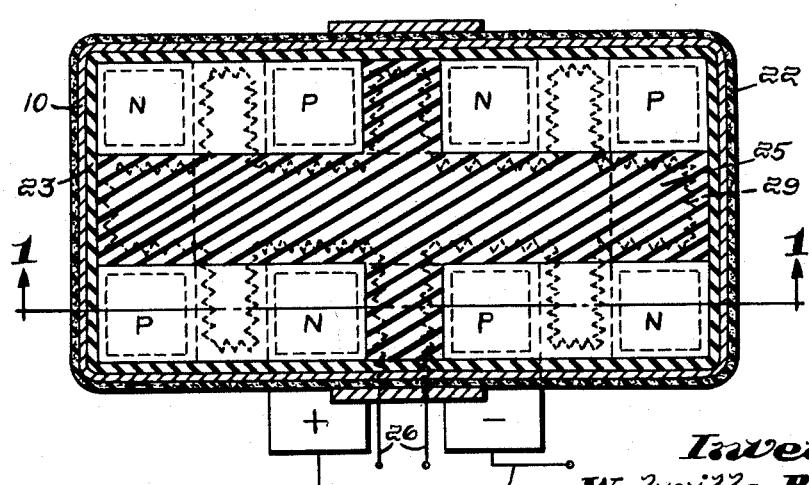

My invention may be better understood from the following description with reference to the accompanying drawings in which:

FIGURE 1 illustrates a vertical cross-sectional view of the invention along the plane of 1—1 of FIGURE 2 together with control box therefor; and FIGURE 2 illustrates a cross-sectional schematic view of the thermoelectric Peltier junction heat-pump module along the plane of 2—2 of FIGURE 1.

Referring to FIGURE 1, bag 10 is a thin flexible inert material impervious to water, natural skin oils and skin minerals, and to filler 11. The material of bag 10 may, for example, be a plastic or plastic-coated fabric, rubber or rubber-coated fabric, etc. Filler 11 consists of a flexible material of high thermal conductivity such as a solution of salts in water or other solvent, a chemical compound that is fluid over the operating temperature range of the invention, relatively fine aluminum or copper shot or powder, or a combination of the same.

The thermoelectric heat-pump section broadly designated as 12, and its Peltier or semiconductor materials 28 in FIGURE 1, is shown to be separated from the flexible filler material 11 of bag 10 by a surface 13 of a strip 24 of high thermal conductivity. Surface 13 thus constitutes the cold or hot surface of the heat-pump module depending upon whether the body being treated is to be cooled or heated. In order to obtain a minimum temperature at the cold surface 13 during cooling, the temperature of the module must be kept as low as practical by virtue of a series of fins 14 protruding from a plate 14a attached to the outer surface of the module 12 with a bond of high thermal conductivity. Fins 14 operate to dissipate absorbed heat to the ambient atmosphere. Plate 14a and fins 14, for example only, may be of black-anodized aluminum.

In the heat-pump module of FIGURES 1 and 2 there are shown four thermoelectric couples whose segments are labelled N and P to designate materials in which the current is carried mainly by electrons and holes, respectively. It is clear that the number of such couples in the device may be varied as desired and are not limited to the illustration shown. Neither is the connection of the couples limited to that shown but may be parallel, series-parallel, or series. The couples may also be cascaded so that the hot junctions of one set are the cold junctions of the next. Encapsulation of the module on its sides is denoted by a thin layer of an electrically and thermally insulating material 23, and at its top and bottom an electrically insulating thermally conducting layer 27a and 27. 30 denotes and comprises a good electrical conductor (see FIGURE 1) such as copper or aluminum, that is compatible with the Peltier junction thermoelectric materials N and P and that is bonded to them with a junction possessing minimum electrical and thermal resistance: 25 denotes an insulator filling such as foamed polyurethane. The Peltier junctions are connected top and bottom by the conductors 30 and 31, respectively, where they join segments N and P.

The direct current (D.C.) power required to drive the heat-pump is furnished through the leads 18, FIGURES 1 and 2. Surface 13 may be either hot or cold, i.e., heat may either be furnished to or removed from the body, depending upon the direction of current flow through the Peltier junctions as regulated by a toggle switch (not shown) on the control box 19. When the module is used to pump heat into a body, it may be more desirable and efficient to use ordinary joule heating, and for this purpose a resistor coil 29 is incorporated into the module as depicted in FIGURE 2. This coil could be heated with either alternating or direct current and would be connected to power through the control box 19 through cables 26 only when the module is to pump heat into the body. A single cable (not shown) could incorporate the power leads 26 for the coil 29 as well as leads 18 for the Peltier junctions and leads 17 for the temperature sensor 16.

The temperature of the exterior of bag 10, and therefore of the body after application of this invention, may be measured by the temperature sensor 16 embedded in bag 10 or attached to the interior or exterior thereof. This temperature may be, for example, a thermocouple or a thermistor. Sensor 16 is connected by leads 17 to the control box 19 having a dial 20 for preset temperature controls. The dial 20 shown on the control box 19 depicts a means for selecting the temperature at which sensor 16 will be kept by the controls, which controls may be of any that are in common use. A further control on the length of time the heat-pump is operated may be obtained by incorporating a timer into the control box 19 (not shown). The timer may also be used to cycle the heat-pump module and thus alternately heat and cool the body, in which case additional controls would be required. The control box is plugged into common power receptacles by the cord 21. Since box 19 which contains the power supply, cycling, on-off controls and circuitry therefor is not novel and are not novel, per se, they are not shown in the drawings.

A thin layer 22 of porous, flexible, sponge-like material commercially known for example as polyurethane may be fastened to the exterior of bag 10. The purpose of this spongy material is to hold a thin layer of water or other solution next to the body in the event that more efficient heat transfer is desired between bag 10 and the body or in the event that the water or other solution is desirable for therapeutic reasons. Both bag 10 and spongy material 22 should be easy to clean and sanitize, as is the case with plastic, plastic-coated, rubber, rubber-coated, or similar materials. The entire device is conveniently handled and applied by means of handle 15.

If an extended area of a body is to be adjusted either to a uniform temperature or to various temperatures at different spots over the area, any number of units of this invention may be joined together by articulated or universal joint couplings so that the contiguous flexible bags abut one another when pressed against the body.

It should be understood that the present disclosure is for the purpose of illustration only and that this invention includes all modifications and equivalents which fall within the scope of the appended claims.

I claim:

1. An article of manufacture for controlling the temperature of a body or region that may possess an irregular surface comprising: a thermally conductive flexible bag comprising two sections, a first section containing a flexible high thermally conductive material one side of said section being adaptable to conform to the shape of an external adjacent body for heat transfer, a second adjacent section in contact with the opposite side of said first section and containing a thermoelectric heat-pump module for heat transfer to or from the body through said first section, a D.C. power source connected to said thermoelectric heat-pump module, a temperature sensing element operatively connected to said heat pump in the first section of the flexible bag located at least near the surface portion of the bag that is adapted to be in contact with said body for measuring and controlling the temperature of the bag.

2. The article of claim 1 wherein said flexible high thermally conductive material is selected from the group consisting of fine metal shot or powder, solutions of salts, and combinations of the same.

3. The article of claim 1 wherein said thermoelectric heat-pump module comprises a group of Peltier junctions.

4. The article of claim 1 wherein said thermoelectric heat-pump module comprises a group of semiconductor thermoelectric materials.

5. The article of claim 1 wherein the arrangement of the heat-pump module is selected from the group consisting of series, parallel, cascade, and combinations of the same.

6. The article of claim 1 wherein the flexible bag consists of thin flexible inert material impervious to water, skin oils and skin minerals selected from the group consisting of plastics, plastic-coated fabric, rubber and rubber-coated fabric.

7. The article of claim 1 wherein the thermoelectric heat-pump module includes a series of heat conducting fins extending from the exposed surface of said second section.

8. The article of claim 1 wherein the thermoelectric heat-pump module includes an extended resistor coil with a power source therefor to be operated when said pump is controlled as a heating device.

9. An article of manufacture for controlling the temperature of a living body or portion thereof when placed in contact therewith and adapted to conform to the contour of the surface of said body comprising: a flexible heat conductive bag of inert, moisture impervious material, a first section thereof adapted to be in contact with and conform to the shape of said body and containing a flexible, highly thermally conductive material therein, a second section adjacent said first section in a direction away from the body to be contacted, said second section containing a group of thermoelectric heat-pump modules, a D.C. power source for said modules, a series of thermally conducting fins extending from said modules in a direction away from said body, a temperature sensor embedded in the surface of said flexible bag at a point adapted to be adjacent the body to be contacted for heat transfer, control means for automatically regulating the power means to the heat-pump modules in accordance with the thermal sensor response, thus controlling the body surface temperature, and a thin layer of a flexible, spongy moisture absorbent material fastened to the outside surface of said bag for increased efficiency of heat transfer between said bag and said adjacent body and for therapeutic purposes.

References Cited in the file of this patent

UNITED STATES PATENTS

| | | |
|---|---|---|
| 1,998,807 | Galvin | Apr. 23, 1935 |
| 2,697,424 | Hanna | Dec. 21, 1954 |
| 2,928,253 | Lopp | Mar. 15, 1960 |
| 3,080,723 | Price | Mar. 12, 1963 |
| 3,088,288 | Elfving | May 7, 1963 |